(12) United States Patent
Chretien et al.

(10) Patent No.: US 10,630,219 B2
(45) Date of Patent: Apr. 21, 2020

(54) DRIVE CIRCUIT FOR ELECTRIC MOTORS

(71) Applicant: Regal Beloit America, Inc., Beloit, WI (US)

(72) Inventors: Ludovic Andre Chretien, Columbia City, IN (US); Joseph Stephen Carnes, Columbia City, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 0 days.

(21) Appl. No.: 15/944,381

(22) Filed: Apr. 3, 2018

(65) Prior Publication Data
US 2019/0305708 A1 Oct. 3, 2019

(51) Int. Cl.
| | | |
|---|---|---|
| H02M 1/44 | (2007.01) | |
| H02M 7/06 | (2006.01) | |
| H02M 5/458 | (2006.01) | |
| H02P 25/04 | (2006.01) | |
| H02P 27/06 | (2006.01) | |
| H02M 7/5387 | (2007.01) | |

(52) U.S. Cl.
CPC .............. H02P 25/04 (2013.01); H02M 1/44 (2013.01); H02P 27/06 (2013.01); *H02M 5/458* (2013.01); *H02M 7/06* (2013.01); *H02M 7/5387* (2013.01); *H02P 2201/03* (2013.01)

(58) Field of Classification Search
CPC H02P 25/04; H02P 1/10; H02P 27/06; H02M 1/44; H02M 2001/325; H02M 5/458
See application file for complete search history.

(56) References Cited

U.S. PATENT DOCUMENTS

| 5,883,490 A | * | 3/1999 | Moreira | H02P 25/04 318/772 |
|---|---|---|---|---|
| 6,295,215 B1 | * | 9/2001 | Faria | H02J 9/062 363/124 |
| 6,570,778 B2 | | 5/2003 | Lipo et al. | |
| 6,952,088 B2 | | 10/2005 | Woodward et al. | |
| 7,272,302 B2 | | 9/2007 | Woodward et al. | |
| 8,820,105 B2 | * | 9/2014 | Norbeck | F25B 49/025 62/228.1 |
| 9,344,001 B2 | * | 5/2016 | Eigenbrodt | H02M 7/42 |

(Continued)

FOREIGN PATENT DOCUMENTS

CN 204179938 U * 2/2015

*Primary Examiner* — Jorge L Carrasquillo
*Assistant Examiner* — Said Bouziane
(74) *Attorney, Agent, or Firm* — Armstrong Teasdale LLP

(57) ABSTRACT

A drive circuit for an electric motor includes a first filter, a rectifier, an inverter, and a line contactor. The first filter is configured to be coupled to an AC source and produces a filtered line frequency AC signal. The rectifier is coupled to the filter and produces a DC signal from the filtered line frequency AC signal. The inverter is coupled to the rectifier and produces an AC signal on an output node of the inverter. The AC signal is supplied to the electric motor to energize its stator windings. The line contactor is coupled between an output node of the first filter and the output node of the inverter. The line contactor supplies the output node of the inverter directly with the filtered line frequency AC signal to energize the stator windings when the inverter is disabled.

21 Claims, 4 Drawing Sheets

(56) References Cited

U.S. PATENT DOCUMENTS

| | | | |
|---|---|---|---|
| 2007/0007922 A1* | 1/2007 | Sarlioglu | H02P 1/029 318/438 |
| 2009/0109713 A1* | 4/2009 | Schnetzka | H02M 5/4585 363/34 |
| 2011/0141774 A1* | 6/2011 | Kane | H02M 1/126 363/37 |
| 2013/0043721 A1* | 2/2013 | Peitzke | B60L 9/00 307/9.1 |
| 2014/0034284 A1 | 2/2014 | Butler et al. | |
| 2015/0001021 A1* | 1/2015 | Matsumoto | B60L 9/18 191/4 |
| 2017/0077857 A1* | 3/2017 | Chretien | H02P 1/426 |

\* cited by examiner

DRIVE CIRCUIT FOR ELECTRIC MOTORS

BACKGROUND

The field of the disclosure relates generally to a drive circuit for an electric motor, specifically a permanent split capacitor (PSC) motor and, more specifically, a drive circuit that enables synchronized transfer to line frequency power under load.

At least some known PSC motors are fixed speed motors that operate most efficiently at line frequency power. Such PSC motors exhibit uncontrolled acceleration during startup. Further, at low load conditions, such PSC motors operate less efficiently. Alternatively, a PSC motor may be driven with a variable speed motor controller to adapt motor speed to a load level. Such configurations are generally limited by power factor, electromagnetic interference, and electrical losses.

A hybrid drive circuit for PSC motors enables efficient operation at both high and low load conditions. For example, a PSC motor operating a compressor in a heating, ventilation and air conditioning (HVAC) system may experience high load conditions during peak temperatures and low load conditions during milder temperatures. The drive circuit operates the PSC motor using an inverter under low load conditions, and operates the PSC motor using line frequency power under high load conditions.

When starting up a compressor, the load on the PSC motor is generally low and builds over time as suction and discharge pressures increase the torque demand on the PSC motor. The starting torque output of the PSC motor, at line frequency power, for example, is generally higher than the torque load at startup. Conversely, when a compressor has been operating for some time, suction and discharge pressures may build up that produce a torque load that exceeds the starting torque output, thus preventing the PSC motor from turning, i.e., a locked rotor or a stalled compressor. At least some system controllers for PSC motors include an interlock that prevents restarts of the PSC motor until pressures have equalized in the compressor, thereby relieving the starting torque load. Such interlocks may be on the order of minutes in duration, during which the compressor cannot operate.

More specifically, in operating a compressor, the inverter and line frequency power cannot both be connected to the electric motor at the same time, because of the potential for a line-to-line short circuit. To transition from inverter to line, or line to inverter, one is disconnected before connecting the other. However, while the inverter can be disconnected in microseconds, the contactor regulating line frequency power to the electric motor can require up to two line cycles, or approximately 16-32 milliseconds (ms), to open or close. Consequently, during transitions from inverter to line or line to inverter, current through the electric motor may decay to zero, leading to a motor stop. Motor speed may decay below a threshold speed within a single line cycle. In some electric motors, the threshold speed may be zero, while for other electric motors, the threshold speed may be above zero. When transitioning from line frequency power to the inverter, the starting torque output available through the inverter generally exceeds the load torque on the electric motor and is limited typically only by the current ratings of the switching components of the inverter. Speed decay is not a problem during such a transition. However, when transitioning from the inverter to line frequency power, the starting torque output at line frequency power may fall below the torque demand from the compressor. Under such conditions, the compressor can stall, i.e., winding current, motor speed, and motor torque decay within a single line cycle, or approximately 16 ms. The typical interlock duration for restarting an electric motor operating a compressor is too long for the electric motor to transition between operation with the inverter to operation at line-frequency power for effective system operation.

Generally, replacing the contactor regulating line frequency power to the electric motor with faster solid state switches is cost-prohibitive in terms of efficiency and thermal management. For example, a typical two pole contactor might consume 12 watts of power, while a suitable solid state substitute, such as, for example, a triode for alternating current (TRIAC), would consume 50 watts.

Solid state switches coupled between the line frequency power source and the stator windings, and wired in parallel to the contactor poles for transitioning between the inverter to line frequency power enable seamless transition without the disadvantages of complete replacement of the contactor. The solid state switches may be limited to conduction for the several line cycles until the contactor closes. Due to rotor slip when the electric motor accelerates to line frequency, the motor current demanded may exceed normal full load motor current demand by up to an order of magnitude for a brief period of time. Accordingly, the solid state switches are capable of conducting peak currents for several line cycles at higher levels than normal operating current. Such solid state switches may include, for example, TRIACs. The solid state switches can close within 3 ms and, in certain embodiments, within 1 ms and, notably, before winding currents decay below a current threshold, which avoids the potential for the compressor to stall during the transition from the inverter to line frequency power. Such a current threshold is generally defined by the torque required to turn the motor given a certain load and motor speed. For example, in certain embodiments, the current threshold may range from zero to 60 amperes depending on motor load and motor speed.

Drive circuits for electric motors are subject to various transient electrical events that can damage the drive circuit or the electric motor itself if not handled properly. Transient electrical events are generally characterized by a rapid change in potential, or voltage, over a brief period of time, otherwise referred to as high delta-Voltage/delta-time, or high dV/dt, events. Such events most often occur on alternating current (AC) lines due to lightning strikes, but may also result from poor or loose connections. Likewise, high dV/dt events may also result from a potential buildup between a chassis, or casing, of the electric motor and the stator windings, which itself may result from a lightning strike, for example. The potential buildup may then be capacitively coupled into the drive circuit through the stator windings. In addition, normal operation of the drive circuit and, more specifically, the switching executed within the inverter, can create high dV/dt noise that can damage components of the drive circuit under certain conditions. For example, under nominal ambient conditions, the high dV/dt noise may be handled properly and not rise to the threshold of damaging the drive circuit. However, under sub-optimal ambient conditions such as, for example, elevated ambient temperatures or humidity, the high dV/dt noise may result in a transient event that can cause damage to the drive circuit. Drive circuits, or "hybrid drive circuits," that include a line synchronization circuit are particularly susceptible to transient electrical, or high dV/dt, events, such as ring waves and combination waves.

BRIEF DESCRIPTION

In one aspect, a drive circuit for an electric motor is provided. The drive circuit includes a first filter, a rectifier, an inverter, and a line contactor. The first filter is configured to be coupled to an AC source. The first filter is configured to produce a filtered line frequency AC signal. The rectifier is coupled to the filter and configured to produce a DC signal from the filtered line frequency AC signal. The inverter is coupled to the rectifier and is configured to produce an AC signal on an output node of the inverter. The AC signal is configured to be supplied to the electric motor to energize the stator windings. The line contactor is coupled between an output node of the first filter and the output node of the inverter. The line contactor is configured to supply the output node of the inverter directly with the filtered line frequency AC signal to energize the stator windings when the inverter is disabled.

In another aspect, a PSC motor is provided. The PSC motor includes a plurality of stator windings and a drive circuit. The plurality of stator windings includes a start winding and a main winding. The drive circuit is coupled to the plurality of stator windings and includes a first filter, a rectifier, an inverter, a line contactor, and a synchronization circuit. The first filter is configured to be coupled to an AC source. The first filter is configured to produce a filtered line frequency AC signal. The rectifier is coupled to the filter and is configured to produce a DC signal from the filtered line frequency AC signal. The inverter is coupled to the rectifier and is configured to produce an AC signal on an output node of the inverter. The AC signal is configured to be supplied to the stator windings. The line contactor is coupled between an output node of the first filter and the output node of the inverter. The line contactor is configured to supply the output node of the inverter directly with the filtered line frequency AC signal to energize the stator windings when the inverter is disabled. The line synchronization circuit is coupled in parallel with the line contactor and includes a semiconductor switch and a second filter. The semiconductor switch is configured to couple the output node of the first filter and the output node of the inverter for at most two cycles of the filtered line frequency AC signal when transitioning from operating the electric motor with the inverter to operating the electric motor with the filtered line frequency AC signal, and while the line contactor is commutating to a closed position.

DETAILED DESCRIPTION

Figure 1:
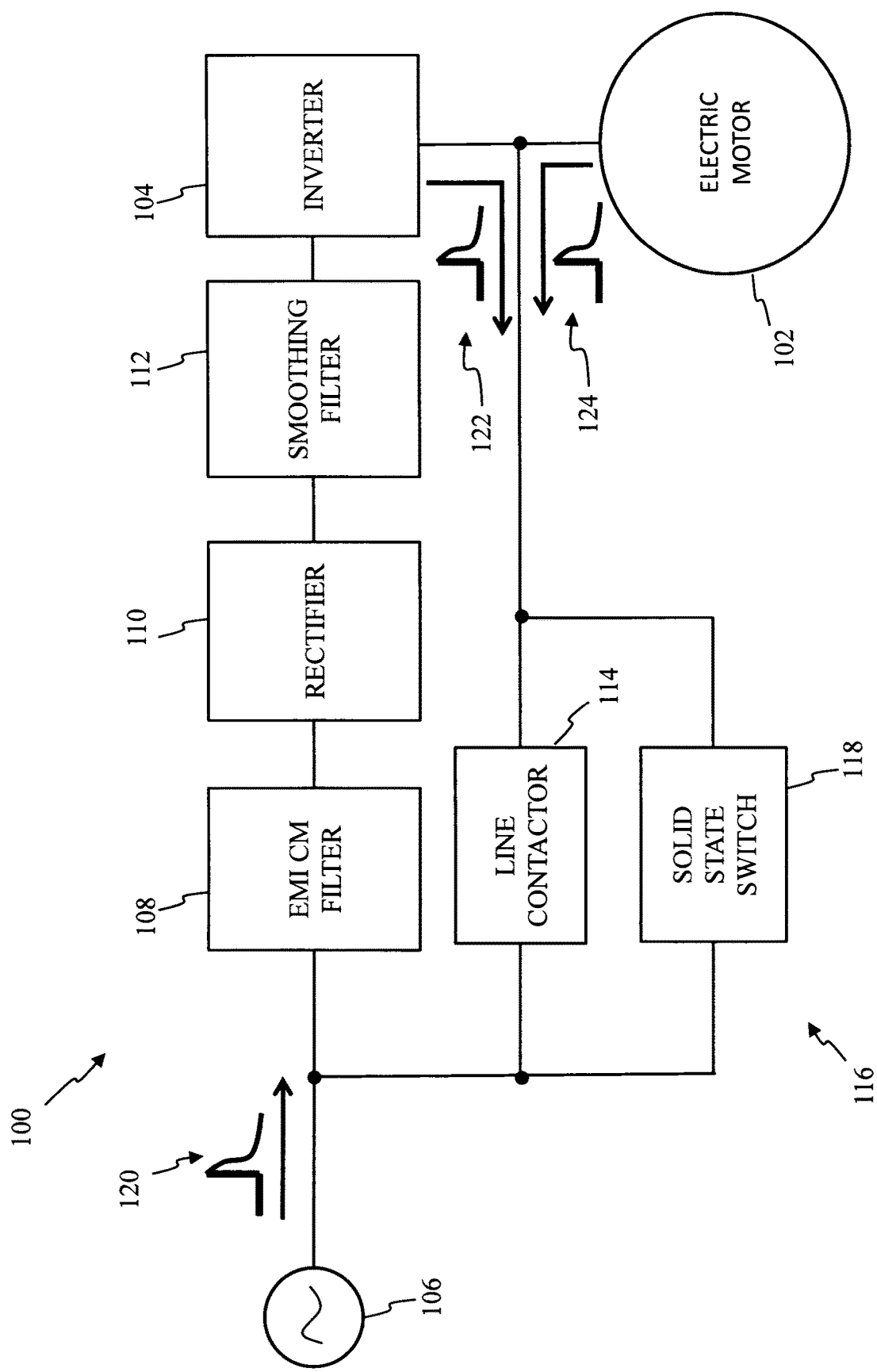
FIG. 1 is a block diagram of a known drive circuit for an electric motor, including a line synchronization circuit.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Drive circuits, or "hybrid drive circuits," that include a line synchronization circuit are particularly susceptible to transient electrical, or high dV/dt, events. More specifically, and particularly for PSC motors for compressors in HVAC or refrigeration applications, the line synchronization circuit, under normal operation, couples line frequency power directly to the stator windings, for example, for 1-2 cycles when transitioning from operating the electric motor using the drive circuit to operating the electric motor directly with line frequency power. During such a transition, it may take several cycles of line frequency power to commutate the line contactor through which line frequency power is applied to the stator windings. The line synchronization circuit bypasses the line contactor for 1-2 cycles to avoid stalling the compressor. The line synchronization circuit generally includes a four-quadrant semiconductor switch that can quickly couple and decouple the line frequency power to the stator windings. Four-quadrant switches are generally characterized by their ability to both gate and conduct opposite polarity signals. In other words, an AC signal exhibits a current that periodically changes polarity, or direction, and therefore only semiconductor switches that can conduct in both directions will appropriately switch the AC signal without significantly degrading the signal itself, e.g., rectification. Four-quadrant semiconductor switches include triode for alternating current (TRIAC) switches, which are used in the line synchronization circuit described above. For the purpose of the line synchronization circuit, TRIAC switches, or simply TRIACs, make and break sufficiently fast and can handle current levels that may greatly exceed normal operating current of the electric motor for 1-2 cycles of the line frequency power.

However, TRIACs and other semiconductor switches are susceptible to high dV/dt events on the AC line, on the stator windings, and on the drive circuit output lines. When a high dV/dt event occurs, a current may flow through an internal capacitive path of the TRIAC and saturate the gate, resulting in a self-triggering, or pulsing of the TRIAC's conductive path. Consequently, line frequency power is applied to the stator windings and the output lines of the drive circuit while the drive circuit is operating, potentially damaging or destroying components of the drive circuit, such as, for example, semiconductor switches inside the inverter. Embodiments of the drive circuits described herein provide more robust protection against transient electrical events. More specifically, embodiments of the drive circuits described herein provide filtering between the line synchronization semiconductor switches and the potential sources of high dV/dt activity, namely, the AC lines, the stator windings, and the output lines of the drive circuit. Such filtering is provided, for example, using inductive electromagnetic interference (EMI) and common mode (CM) filtering, or by capacitive filtering.

FIG. 1 is a block diagram of a known drive circuit 100 for an electric motor 102. Drive circuit 100 energizes the stator windings (not shown) of electric motor 102 through an inverter 104, enabling variable speed operation, or directly with line frequency power from an AC source 106. The main path through inverter 104 includes an EMI CM filter 108, a rectifier 110, a DC link capacitor 112, and inverter 104. A bypass path includes a line contactor 114 that couples line frequency power directly from AC source 106 to the stator windings of electric motor 102. The bypass path also includes a line synchronization circuit 116 that includes at least one solid state switch 118 that couples line frequency power from AC source 106 directly to the stator windings for 1-2 cycles, or 16-32 milliseconds for 60 Hz AC power, while drive circuit 100 transitions from energizing electric motor 102 through inverter 104 to directly from AC source 106 through line contactor 114. Solid state switch 118 may include, for example, a TRIAC switch.

Line frequency power provided by AC source 106 is supplied to the main path of drive circuit 100 first through EMI CM filter 108, which may include one or more stages of inductive and capacitive filtering. Filtered line frequency power is then supplied to rectifier 110 that rectifies the filtered line frequency power to a direct current (DC) signal that is passed through DC link capacitor 112. The DC signal is then supplied to inverter 104. Inverter 104 generates an AC signal for energizing the stator windings of electric motor 102, where the AC signal is of a desired amplitude, frequency, and phase, for example, based on control signals received at inverter 104. Generally, the electrical path through EMI CM filter 108, rectifier 110, DC link capacitor 112, and inverter 104 is a high-impedance path. In contrast, the bypass path through line contactor 114 or solid state switch 118 is relatively low impedance.

Generally, active components of drive circuit 100, such as, for example, inverter 104, line contactor 114, and solid state switch 118, are controlled by a microcontroller (not shown) or other suitable programmable processing device. For example, the microcontroller controls inverter 104 to produce the AC signal having the desired amplitude, frequency, and phase based on a target speed, torque, frequency, or power output for electric motor 102. Further, the microcontroller operates line contactor 114 and solid state switch 118 to transition between energizing electric motor 102 using inverter 104 and energizing electric motor 102 by coupling line frequency power from AC source 106 directly to the stator windings of electric motor 102.

FIG. 1 further illustrates transient electrical events 120, 122, and 124. Transient electrical event 120 represents a high dV/dt event that may occur on the AC line. Transient electrical event 122 represents high dV/dt noise that may be generated within inverter 104. Transient electrical event 124 represents a high dV/dt potential that may capacitively couple to the output lines of inverter 104 through the stator windings of electric motor 102 during a transient event, such as, for example, a lightning strike. Each of transient electrical events 120, 122, and 124 may saturate the gate of solid state switch 118 and cause solid state switch 118 to improperly self-trigger while inverter 104 is operating, resulting in line frequency power supplied from AC source 106 being directly coupled to the output liens of inverter 104 while it is operating, potentially damaging or destroying inverter 104.

Figure 2:
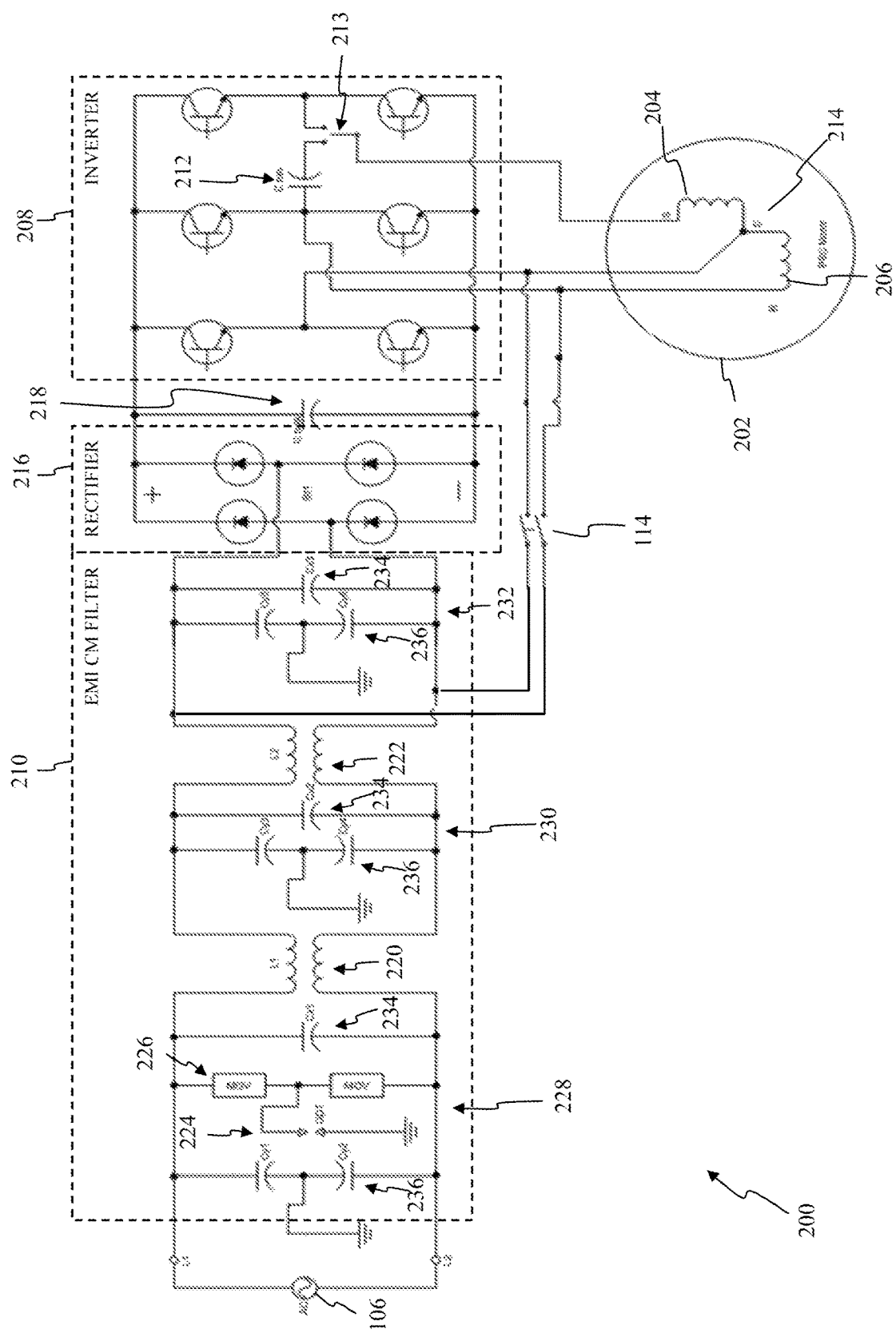
FIG. 2 is a schematic diagram of an exemplary drive circuit for a PSC motor.

FIG. 2 is a schematic diagram of an exemplary drive circuit 200 for a PSC motor 202. Drive circuit 200 energizes stator windings 204 and 206 of PSC motor 202 through an inverter 208, enabling variable speed operation, or directly with filtered line frequency power originating from an AC source 106 (shown in FIG. 1) and having undergone at least some filtering by an EMI CM filter 210 to suppress high dV/dt components of the AC signal.

PSC motor 202 includes start winding 204 and main winding 206. When operating PSC motor 202 using line frequency power supplied through line contactor 114 (shown in FIG. 1), start winding 204 is energized through a run capacitor 212 coupled to start winding 204 by a switch 213, and further coupled to a first line output of a filtering stage of EMI CM filter 210 through line contactor 114. Main winding 206, likewise, is coupled directly to the first line output of the filtering stage of EMI CM filter 210 through line contactor 114. A second line output of the filtering stage of EMI CM filter 210 is coupled to a center tap 214 of PSC motor 202 through contactor 114. Although depicted inside the logical block of inverter 208 in FIG. 2, run capacitor 212 is generally external to and remote from drive circuit 200 due to its size. Run capacitor 212 is depicted in this way for convenience only. In an alternative embodiment, run capacitor 212 is coupled between EMI CM filter 210 and line contactor 114.

Conversely, when operating PSC motor 202 through inverter 208, line contactor 114 is open and the filtered line frequency power from EMI CM filter 210 is supplied to a rectifier 216, a DC link capacitor 218, and to inverter 208. Additionally, switch 213 decouples run capacitor 212 from start winding 204 and instead couples start winding 204 to a phase output of inverter 208.

Rectifier 216 may include, for example, a diode bridge that rectifies the filtered line frequency power to a DC signal that is passed through DC link capacitor 218 before being supplied to inverter 208. Inverter 208 then generates three-phase AC power having a desired frequency and amplitude to drive PSC motor 202 at a target speed, torque, frequency, or power output.

EMI CM filter 210 includes various capacitive and inductive filter stages for suppressing transient electrical events that occur on the AC line. More specifically, EMI CM filter 210 includes a first CM choke stage 220 and a second CM choke stage 222, each of which is generally composed of inductive components. EMI CM filter 210 further includes capacitive filter stages 228, 230, and 232, each including line-to-line capacitors, or X capacitors, 234 and line-to-ground capacitors, or Y capacitors, 236. In addition to EMI CM filter 210, drive circuit 200 includes a spark gap 224 coupled to each AC line through metal oxide varistors (MOVs) 226 to provide further protection against transient electrical events.

Line contactor 114, as described above, is coupled to the first and second line outputs of a filtering stage of EMI CM filter 210. More specifically, line contactor 114 is coupled to the first and second line outputs of second CM choke stage 222, which are electrically equivalent to the input nodes of rectifier 216. In this manner, EMI CM filter 210 functions to suppress high dV/dt components in the line frequency power that would otherwise be incident on, for example, a line synchronization circuit (shown in FIG. 1) if such line synchronization circuit was coupled directly to the AC line. In alternative embodiments, EMI CM filter 210 may include more or fewer filtering stages. In further alternative embodiments, line contactor 114 may couple to the first and second output lines of another filtering stage, such as first CM choke stage 220, or any other filtering stage that provides sufficient suppression of high dV/dt components in the line frequency power supplied by AC source 106.

Figure 3:
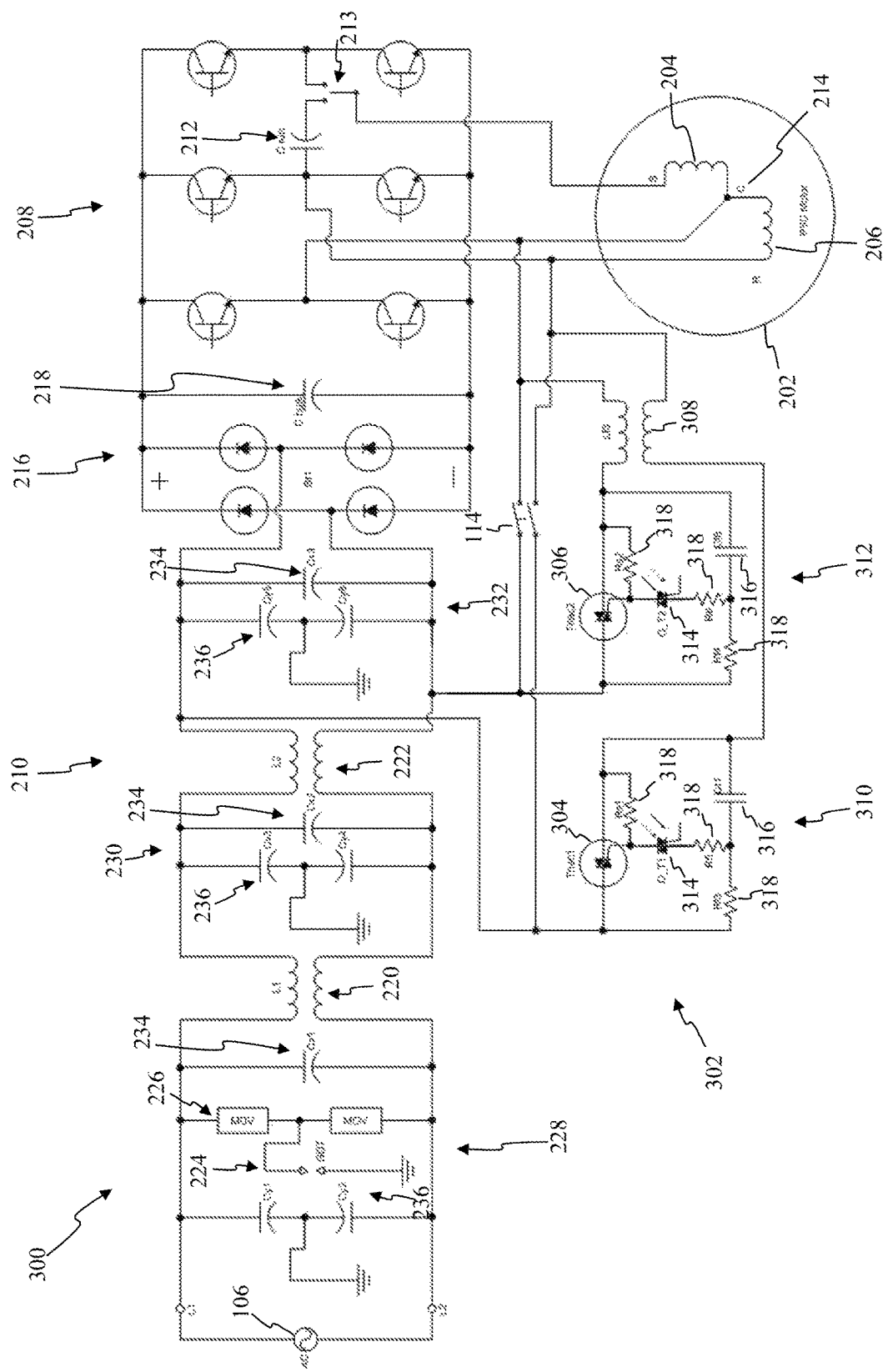
FIG. 3 is a schematic diagram of an exemplary drive circuit for a PSC motor, including an improved line synchronization circuit.

FIG. 3 is a schematic diagram of an exemplary drive circuit 300 for PSC motor 202 (shown in FIG. 2), including an improved line synchronization circuit 302. Drive circuit 300 generally operates the same as drive circuit 200 (shown in FIG. 2), and includes AC source 106, EMI CM filter 210, rectifier 216, DC link capacitor 218, inverter 208, and line contactor 114.

Line synchronization circuit 302 includes TRIAC switches 304 and 306 for fast coupling of filtered line frequency power at the input nodes of rectifier 216 to stator windings 204 and 206 of PSC motor 202. More specifically, TRIAC switches 304 and 306 couple the filtered line frequency power to stator windings 204 and 206 for 1-2 cycles of the filtered line frequency power when transitioning from operating PSC motor 202 through inverter 208 to operating PSC motor 202 directly on filtered line frequency power. In that transition, when line contactor 114 is closed, TRIAC switches 304 and 306 are opened and stator current flows through line contactor 114.

Line synchronization circuit 302 further includes an inductive filter 308 coupled in series between TRIAC switches 304 and 306 and stator windings 204 and 206 of PSC motor 202. Inductive filter 308, similar to CM choke stages 220 and 222, suppresses high dV/dt components that may appear on the output lines of inverter 208 as a result of high dV/dt noise generated by inverter 208 itself, or capacitively coupled onto the output lines of inverter 208 through stator windings 204 and 206 of PSC motor 202. Accordingly, TRIAC switches 304 and 306 are protected from transient electrical events by EMI CM filter 210 on the AC line side, and by inductive filter 308 on the stator winding or inverter output line side.

TRIAC switches 304 and 306 are implemented with respective gating circuits 310 and 312. Gating circuits 310 and 312 include an opto-TRIAC 314 for operating the respective gates of TRIAC switches 304 and 306. Gating circuits 310 and 312 further include a filter capacitor 316 and various resistors 318 for creating a high impedance path relative to the respective conduction paths through TRIACs 304 and 306. In alternative embodiments, opto-TRIAC 314 may be replaced by any suitable device for controlling the gates of TRIAC switches 304 and 306.

Figure 4:
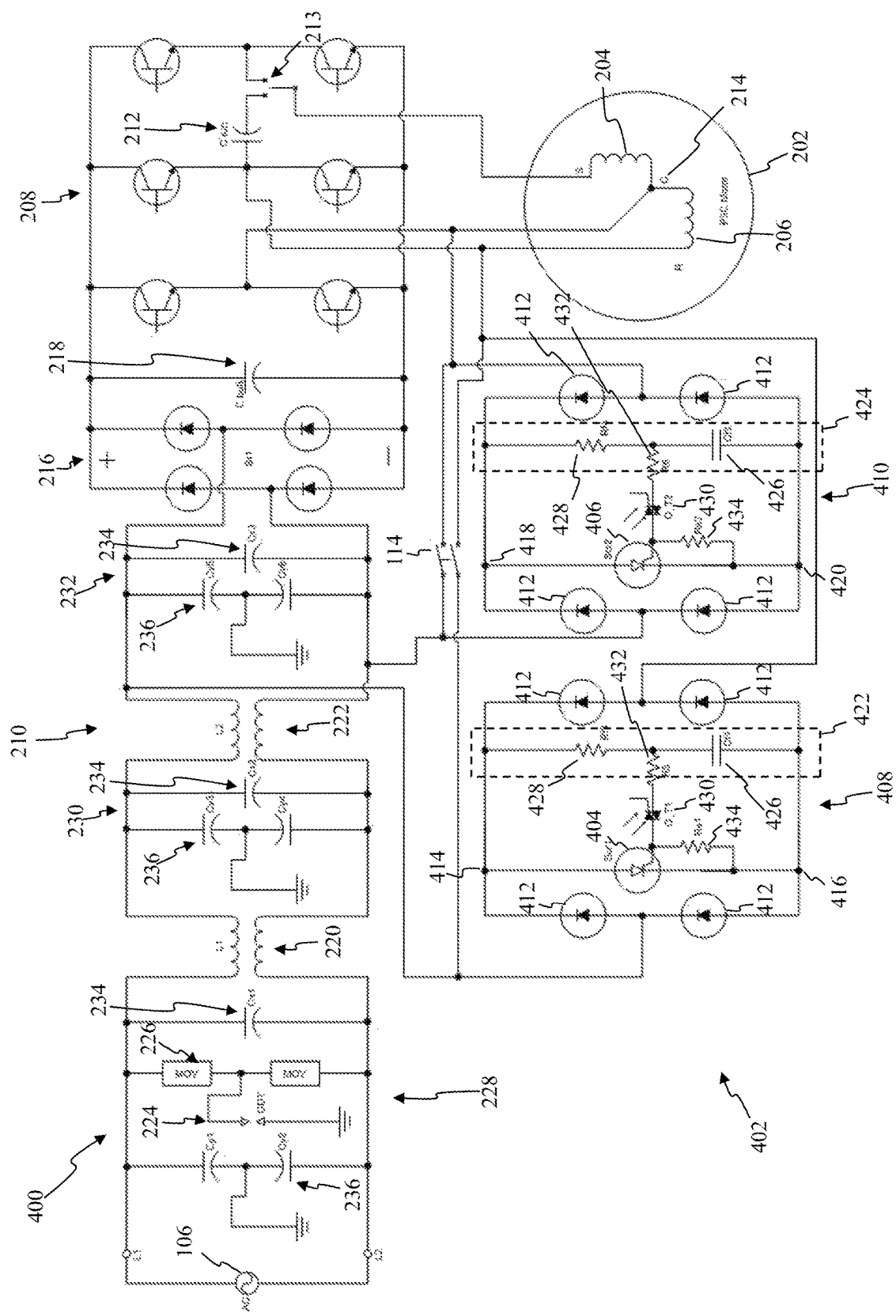
FIG. 4 is a schematic diagram of another exemplary drive circuit for a PSC motor, including an improved line synchronization circuit.

FIG. 4 is a schematic diagram of another exemplary drive circuit 400 for PSC motor 200 (shown in FIG. 2), including an improved line synchronization circuit 402. Drive circuit 400 generally operates the same as drive circuit 200 (shown in FIG. 2), and includes AC source 106, EMI CM filter 210, rectifier 216, DC link capacitor 218, inverter 208, and line contactor 114.

Line synchronization circuit 402 includes silicon controlled rectifier (SCR) switches 404 and 406 for fast coupling of filtered line frequency power at the input nodes of rectifier 216 to stator windings 204 and 206 of PSC motor 202. More specifically, SCR switches 404 and 406 couple the filtered line frequency power to stator windings 204 and 206 for 1-2 cycles of the filtered line frequency power when transitioning from operating PSC motor 202 through inverter 208 to operating PSC motor 202 directly on filtered line frequency power. In that transition, when line contactor 114 is closed, SCR switches 404 and 406 are turned off and stator current flows through line contactor 114.

Line synchronization circuit 402 further includes respective diode bridges 408 and 410, composed of diodes 412, within which SCR switches 404 and 406 are implemented. More specifically, SCR switch 404, for example, is coupled across intermediate nodes 414 and 416 of diode bridge 408. SCR switch 404, by coupling across diode bridge 408, is operable as a bi-directional, or four-quadrant, switch that is suitable for AC switching. Likewise, SCR switch 406 is coupled across intermediate nodes 418 and 420 of diode bridge 410.

Line synchronization circuit 402 further includes resistor-capacitor (RC) filters 422 and 424 coupled in parallel with stator windings 204 and 206 of PSC motor 202. Similar to capacitive filtering in EMI CM filter 210, RC filters 422 and 424 suppress high dV/dt components that may appear on the output lines of inverter 208 as a result of high dV/dt noise generated by inverter 208 itself, or capacitively coupled onto the output lines of inverter 208 through stator windings 204 and 206 of PSC motor 202. Accordingly, SCR switches 404 and 406 are protected from transient electrical events by EMI CM filter 210 on the AC line side, and by RC filters 422 and 424 on the stator winding or inverter output line side.

RC filters 422 and 424 may be implemented, for example, (a) outside of diode bridges 408 and 410, such as a substitute for inductive filter 308 (shown in FIG. 3), or (b) within diode bridges 408 and 410, as shown in FIG. 4. In embodiment (a), RC filters 422 and 424 have the benefit of being less expensive that an inductive alternative; however, without diode bridges 408 and 410, RC filters 422 and 424 would have to be rated to dissipate a significant amount of power in the AC signal generated at the output of inverter 208. Consequently, an embodiment utilizing TRIAC switches 304 and 306 (shown in FIG. 3) and RC filters 422 and 424 is less practical than embodiment (b) (shown in FIG. 4).

Embodiment (b), with reference to FIG. 4, RC filters 422 and 424 are implemented in parallel with SCR switches 404 and 406 and within diode bridges 408 and 410, respectively. Further, the implementation of SCR switches 404 and 406 within diode bridges 408 and 410, respectively, enables the adaptation of RC filters 422 and 424 to also be implemented within diode bridges 408 and 410. A benefit of such an implementation is that, for example, RC filter 404 is isolated from the AC signal generated at the output of inverter 208 by diode bridge 408. Such isolation allows RC filter 404 to be rated for lower wattage, exhibits less ripple, and utilizes a smaller capacitance. RC filters 422 and 424 include a capacitance 426 and a resistance 428 coupled in series between intermediate nodes 414 and 416, and intermediate nodes 418 and 420, respectively.

SCR switches 404 and 406 are controlled by respective gate circuits including opto-TRIAC 430 and resistors 432 and 434. In an alternative embodiment, TRIAC switches may be substituted for SCR switches 404 and 406. However, SCR switches have the benefit of being simpler and less expensive relative to a comparable TRIAC device.

The methods and systems described herein may be implemented using computer programming or engineering techniques including computer software, firmware, hardware or any combination or subset thereof, wherein the technical effect may include at least one of: (a) seamless transition from inverter driven PSC motor to filtered line frequency power; (b) reducing duration of high-current conduction through solid state switching through use of parallel contactor and solid state switch configuration; (c) reducing switching of contactor under load; (d) avoiding interlock for startup of PSC motor; (e) enabling full load starting of the PSC motor due to avoidance of the starting torque demand limits; (f) reducing inrush current when transitioning to line frequency power directly from the inverter versus from startup; (g) improving redundancy with respect to the contactor regulating line frequency power; (h) suppressing transient electrical events originating on the AC line; (i) suppressing transient electrical events originating within the inverter due to high frequency switching; (j) suppressing transient electrical events capacitively coupled into the drive circuit through the stator windings of the electric motor; (k) reducing false triggering of the line synchronization circuit due to transient electrical events; and (l) reducing failures within the drive circuit and, in particular, the inverter due to false triggering of the line synchronization circuit.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drive circuit for an electric motor, said drive circuit comprising:
    a first filter configured to be coupled to an alternating current (AC) source, said first filter configured to produce a filtered line frequency AC signal;
    a rectifier coupled to said first filter and configured to produce a direct current (DC) signal from the filtered line frequency AC signal;
    an inverter coupled to said rectifier and configured to produce an AC signal on an output node of said inverter, the AC signal configured to be supplied to the electric motor to energize stator windings thereof;
    a line contactor coupled between an output node of said first filter and the output node of said inverter, said line contactor configured to supply the output node of said inverter directly with the filtered line frequency AC signal to energize the stator windings therewith when said inverter is disabled; and
    a line synchronization circuit coupled in parallel with said line contactor and comprising a semiconductor switch and a second filter, said semiconductor switch configured to couple the output node of said first filter and the output node of said inverter when transitioning from operating the electric motor with said inverter to operating the electric motor with the filtered line frequency AC signal, and while said line contactor is commutating to a closed position.

2. The drive circuit of claim 1, wherein said first filter comprises an electromagnetic interference (EMI) common mode (CM) filter, said EMI CM filter further comprising at least one CM choke stage and at least one line-to-line and line-to-ground capacitive filtering stage.

3. The drive circuit of claim 2, wherein the output node of said first filter is positioned between a first CM choke stage and a second CM choke stage.

4. The drive circuit of claim 2, wherein the output node of said first filter is positioned at an input node of said rectifier.

5. The drive circuit of claim 1, wherein said second filter comprises an inductive filter coupled between the semiconductor switch and the output node of said inverter.

6. The drive circuit of claim 5, wherein said semiconductor switch comprises a silicon controlled rectifier (SCR) switch.

7. The drive circuit of claim 5, wherein said semiconductor switch comprises a triode for alternating current (TRIAC) switch.

8. The drive circuit of claim 7 further comprising an opto-TRIAC device for controlling a gate of said TRIAC switch.

9. The drive circuit of claim 1, wherein said second filter comprises a capacitive filter coupled in parallel with the output node of said inverter.

10. The drive circuit of claim 9, wherein said capacitive filter comprises a resistor-capacitor (RC) filter.

11. The drive circuit of claim 9, wherein said semiconductor switch comprises a triode for alternating current (TRIAC) switch.

12. The drive circuit of claim 11, wherein said line synchronization circuit further comprises a gate circuit having an opto-TRIAC device for controlling a gate of said SCR switch.

13. The drive circuit of claim 9, wherein said semiconductor switch comprises a silicon controlled rectifier (SCR) switch.

14. The drive circuit of claim 13, wherein said line synchronization circuit further comprises a diode bridge having intermediate nodes, and wherein said SCR switch is coupled between said intermediate nodes.

15. The drive circuit of claim 14, wherein said capacitive filter is coupled between said intermediate nodes.

16. A permanent split capacitor (PSC) motor, comprising:
    a plurality of stator windings, including a start winding and a main winding; and
    a drive circuit coupled to said plurality of stator windings, said drive circuit comprising:
    a first filter configured to be coupled to an alternating current (AC) source, said first filter configured to produce a filtered line frequency AC signal;

a rectifier coupled to said first filter and configured to produce a direct current (DC) signal from the filtered line frequency AC signal;

an inverter coupled to said rectifier and configured to produce an AC signal on an output node of said inverter, the AC signal configured to be supplied to said plurality of stator windings;

a line contactor coupled between an output node of said first filter and the output node of said inverter, said line contactor configured to supply the output node of said inverter directly with the filtered line frequency AC signal to energize said plurality of stator windings therewith when said inverter is disabled; and a line synchronization circuit coupled in parallel with said line contactor and comprising a semiconductor switch and a second filter, said semiconductor switch configured to couple the output node of said first filter and the output node of said inverter when transitioning from operating the PSC motor with said inverter to operating the PSC motor with the filtered line frequency AC signal, and while said line contactor is commutating to a closed position.

17. The PSC motor of claim 16, wherein said semiconductor switch is further configured to couple the output node of said first filter and the output node of said inverter for at most two cycles of the filtered line frequency AC signal when transitioning.

18. The PSC motor of claim 16, wherein said semiconductor switch comprises a triode for alternating current (TRIAC) switch coupled in series with the second filter, said second filter comprising an inductive filter.

19. The PSC motor of claim 16, wherein said line synchronization circuit further comprises a diode bridge having intermediate nodes, wherein said semiconductor switch comprises a silicon controlled rectifier (SCR) switch coupled between said intermediate nodes, and wherein said second filter comprises a resistor-capacitor (RC) filter coupled between said intermediate nodes.

20. The PSC motor of claim 16, wherein said first filter comprises an electromagnetic interference (EMI) common mode (CM) filter, said EMI CM filter further comprising at least one CM choke stage and at least one line-to-line and line-to-ground capacitive filtering stage, and wherein the output node of said first filter is positioned at an input node of said rectifier.

21. A permanent split capacitor (PSC) motor, comprising:
a plurality of stator windings, including a start winding and a main winding; and
a drive circuit coupled to said plurality of stator windings, said drive circuit comprising:
a first filter configured to be coupled to an alternating current (AC) source, said first filter configured to produce a filtered line frequency AC signal;
a rectifier coupled to said first filter and configured to produce a direct current (DC) signal from the filtered line frequency AC signal;
an inverter coupled to said rectifier and configured to produce an AC signal on an output node of said inverter, the AC signal configured to be supplied to said plurality of stator windings; and
a line synchronization circuit coupled between an output node of said first filter and the output node of said inverter, said line synchronization circuit comprising a semiconductor switch and a second filter, said semiconductor switch configured to couple the output node of said first filter and the output node of said inverter to supply the output node of said inverter directly with the filtered line frequency AC signal to energize said plurality of stator windings when said inverter is disabled.

* * * * *